(12) United States Patent
Blanc et al.

(10) Patent No.: US 9,241,593 B2
(45) Date of Patent: Jan. 26, 2016

(54) SYSTEM FOR PREPARING BEVERAGES BY INFUSION

(75) Inventors: Jean-Pierre Blanc, Nice (FR); Alain Goering, Nice (FR)

(73) Assignee: COMPAGNIE MEDITERRANEENNE DES CAFES (SA), Carros (FR)

(*) Notice: Subject to any disclaimer, the term of this patent is extended or adjusted under 35 U.S.C. 154(b) by 965 days.

(21) Appl. No.: 12/601,083

(22) PCT Filed: May 19, 2008

(86) PCT No.: PCT/EP2008/056101
§ 371 (c)(1),
(2), (4) Date: Nov. 20, 2009

(87) PCT Pub. No.: WO2008/142040
PCT Pub. Date: Nov. 27, 2008

(65) Prior Publication Data
US 2010/0159108 A1     Jun. 24, 2010

(30) Foreign Application Priority Data

May 21, 2007   (FR) ...................................... 07 55149

(51) Int. Cl.
*A47J 31/40* (2006.01)
*A47J 31/36* (2006.01)

(52) U.S. Cl.
CPC ............ *A47J 31/407* (2013.01); *A47J 31/3633* (2013.01); *A47J 31/3638* (2013.01)

(58) Field of Classification Search
CPC ... A47J 31/00; A47J 31/3638; A47J 31/3633; A47J 31/368

USPC ................ 99/295, 289 R, 302 R, 323.9, 275, 99/316–320; 426/590, 77–84; 222/81, 222/83.5, 129.1, 325
See application file for complete search history.

(56) References Cited

U.S. PATENT DOCUMENTS

| | | | | |
|---|---|---|---|---|
| 3,587,919 | A | * | 6/1971 | Landis .......................... 221/194 |
| 5,755,149 | A | * | 5/1998 | Blanc et al. .................. 99/289 T |
| 5,974,949 | A | | 11/1999 | Weber et al. |
| 6,035,762 | A | * | 3/2000 | Ruckstuhl ....................... 99/295 |
| 6,095,031 | A | * | 8/2000 | Warne ............................. 99/282 |

(Continued)

FOREIGN PATENT DOCUMENTS

| | | |
|---|---|---|
| EP | 0 867 142 | 9/1998 |
| FR | 2 713 905 | 6/1995 |

(Continued)

OTHER PUBLICATIONS

International Search Report dated Jul. 24, 2008, from corresponding PCT application.

*Primary Examiner* — Reginald L Alexander
(74) *Attorney, Agent, or Firm* — Young & Thompson

(57) ABSTRACT

A system 10 and process for making beverages by infusing a product contained in a package 1. System 10 has an infusion chamber 7, a closure device 60 including upstream closure element 61 for selectively preventing and allowing access to chamber 7 from upstream of the latter and downstream closure element 62 for selectively receiving package 1 in chamber 7 or allowing package 1 to fall out of chamber 7 by gravity, the position of the upstream closure element 61 conditioning the position of downstream closure element 62 and vice versa.

9 Claims, 14 Drawing Sheets

(56) References Cited

U.S. PATENT DOCUMENTS

| | | | |
|---|---|---|---|
| 6,116,147 A * | 9/2000 | Schmed | 99/302 P |
| 6,431,055 B2 * | 8/2002 | Bonanno | 99/302 P |
| 6,505,544 B1 * | 1/2003 | Blanc et al. | 99/289 R |
| 6,595,108 B1 | 7/2003 | Blanc | |
| 7,051,646 B2 * | 5/2006 | Della Pietra et al. | 99/280 |
| 7,210,401 B1 * | 5/2007 | Rolfes et al. | 99/289 R |
| 2003/0071056 A1 * | 4/2003 | Hale | 222/83 |
| 2005/0061158 A1 * | 3/2005 | Della Pietra et al. | 99/279 |
| 2005/0106288 A1 * | 5/2005 | Blanc et al. | 426/77 |
| 2005/0235834 A1 * | 10/2005 | Blanc et al. | 99/279 |
| 2006/0037483 A1 * | 2/2006 | Kief, Jr. | 99/295 |
| 2007/0104837 A1 * | 5/2007 | Yoakim et al. | 426/77 |
| 2008/0121111 A1 * | 5/2008 | Paget et al. | 99/295 |
| 2010/0037779 A1 * | 2/2010 | Pecci et al. | 99/289 R |

FOREIGN PATENT DOCUMENTS

| | | |
|---|---|---|
| FR | 2 745 995 | 9/1997 |
| WO | 95/17121 | 6/1995 |
| WO | 00/38558 | 7/2000 |
| WO | WO 2008096385 A1 * | 8/2008 |

* cited by examiner

SYSTEM FOR PREPARING BEVERAGES BY INFUSION

The present invention concerns a device for making beverages by infusing a product contained in a package.

It finds its application more particularly in the field of espresso-type coffee machines. It may also be used to make other beverages such as tea.

Many coffee machines now use disposable individual packages of ground coffee. The user no longer has direct contact with the ground coffee making it easier to handle and results in a cleaner beverage-making operation.

Hence, document WOA9517121 proposes an automatic machine for making hot drinks by infusion comprising an infusion chamber designed to receive a package of the product, and consisting of two half chambers arranged so that they are mutually apart or brought together in order to open or close the infusion chamber. A clamp is also proposed at the low position of the infusion chamber in order to hold the package or allow its rejection by gravity when the stop is retracted. A flap is also proposed in the upper position of the infusion chamber.

This type of machine has proved to be generally satisfactory. However, due to its competitive environment, it has to be constantly improved. In this context, the present invention wishes to improve the reliability of existing machines.

SUMMARY OF THE INVENTION

To achieve this, a system is proposed for producing beverages by infusing a product contained in a package and consisting of:
  an infusion chamber designed to receive a package,
    the chamber consisting of two half chambers arranged so as to be apart or brought together in order to open or close the chamber respectively,
  a closure device comprising:
    upstream closure means positioned and arranged so as to prevent or allow by selection a package to drop into the chamber,
    downstream closure means arranged so as to prevent or allow by selection a package to drop out of the chamber,
  the closure device being arranged to change alternately:
    from the first position in which:
      upstream closure means prevent a package from entering the chamber,
      downstream closure means allow a package to drop out of the chamber,
    a second position in which:
      upstream closure means allow a package to drop into the chamber,
      downstream closure means allow to receive a package in chamber and prevent the latter from exiting chamber,
  the closure device is arranged so that:
    the position of the upstream closure means condition the position of the downstream closure means,
    the position of the downstream closure means condition the position of the upstream closure means.

Thus, the invention describes a sequential operating principle. The downstream closure means may only adopt one position for a given position of the upstream closure means. Conversely, the upstream closure means may only take up one position for a given position of the downstream closure means. Thus, the relative positions between the upstream positioning means on the one hand and downstream positioning means on the other is perfectly controlled.

However, the applicant has observed that the reliability of existing machines depends in particular on the control of the relative positions of the upstream positioning means on the one hand and the downstream positioning to means on the other.

Therefore, it can be said that the invention improves the reliability of existing machines.

Optionally, the invention may also have an additional feature ensuring that the closure device is arranged so that the upstream closure means coact with the downstream closure means.

This ensures a significant reduction in both the number of moving parts compared to the other parts and the complexity of the system's structure. This structure simplifies the kinematics of the systems for passing alternately from the first to the second position. This leads to a substantial reduction in the risks of mechanism jamming, the number of parts involved, the production costs and the number of defects.

Moreover, the system according to the invention will present at least one of the following optional features:
  the system is equipped with a pump for supplying the chamber with liquid, and/or an actuator moving both half chambers and slaving means so that operation of the pump and/or operation of the actuator are slaved to the position of the closure device,
  the upstream closure means are arranged so as to ensure that a package is received and held outside the chamber in the first position,
  the closure device is arranged to translate relative to the frame of the system in order to pass alternately from the first to the second position,
  the closure device is arranged so as to turn relative to a frame of the system in order to pass alternately from the first to the second position,
  the system includes guiding means arranged to guide the package into the chamber and keep it on a level with the chamber when the upstream closure means are deactivated,
  the system includes a trap door forming an opening arranged upstream of the upstream closure means and is designed so that the closure device is equipped with obstructing means arranged so that the trap door opening is unobstructed when the closure device is in the first position and obstructed when the closure device is in the second position,
  the upstream closure means, the downstream closure means and the obstructing means are mutually interdependent,
  the closure device consists of one part,
  the system is equipped with warning devices arranged so as to dispatch a warning to the user when the closing device is not positioned is properly,
  In addition, according to this invention a closure device able to selectively prevent and allow access to an infusion chamber designed to receive a package for making a beverage comprising upstream closure means that will selectively prevent or allow access to the chamber from upstream, and downstream closure means designed to selectively either receive the package in the chamber or allow the package to leave the chamber by gravity, the upstream closure means coacting with the downstream closure means.

In addition, the closure device has the additional feature of moving alternately in at least one given main direction, in that the upstream closure means and the downstream closure means are arranged so as to present an offset one relative to the other in this main given direction.

The invention also concerns a machine for producing beverages by the infusion of a product contained in a package comprising a system according to any one of the previous characteristics or with a closure device according to any one of the previous characteristics.

In addition, the invention also covers a process for producing beverages by infusing a product contained in a package using a system according to any one of the previous characteristics or by using a closure device according to any one of the previous characteristics, or by using a machine according to the previous characteristic.

BRIEF DESCRIPTION OF THE DRAWINGS

Other characteristics, aims and advantages of this invention will come to light on reading the following detailed description and considering the appended drawings which are given as non exhaustive examples and on which.

EXAMPLE OF AN EMBODIMENT ACCORDING TO THE INVENTION

Figure 1:
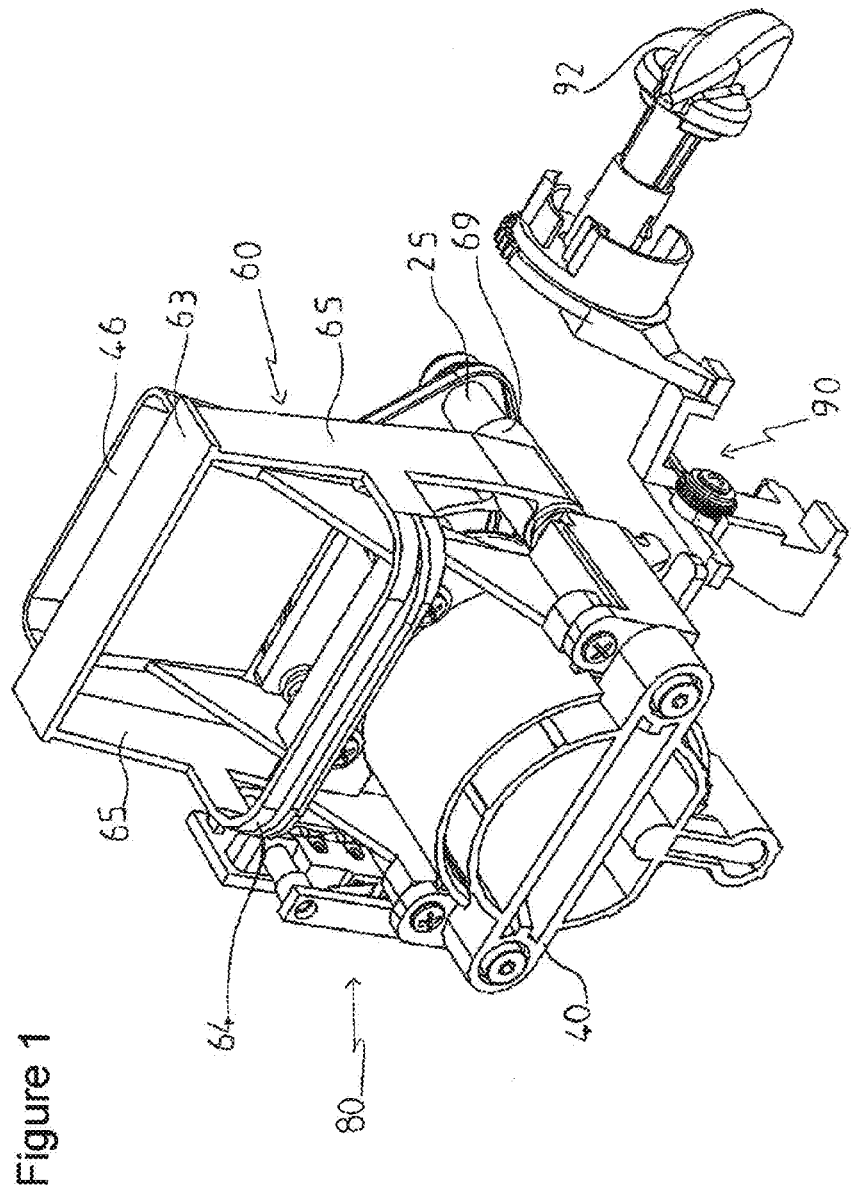
FIG. 1 is a view in perspective of the right side of a beverage production system according to one example of an embodiment according to the invention.
Figure 2:
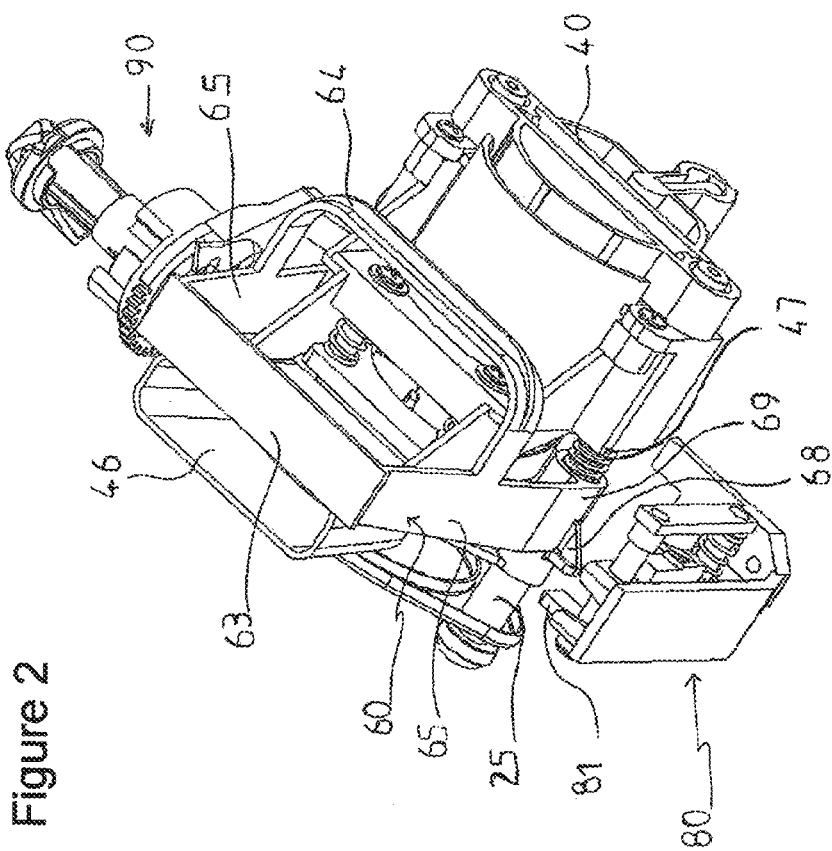
FIG. 2 is a view in perspective of the left side of the system shown in FIG. 1.
Figure 3:
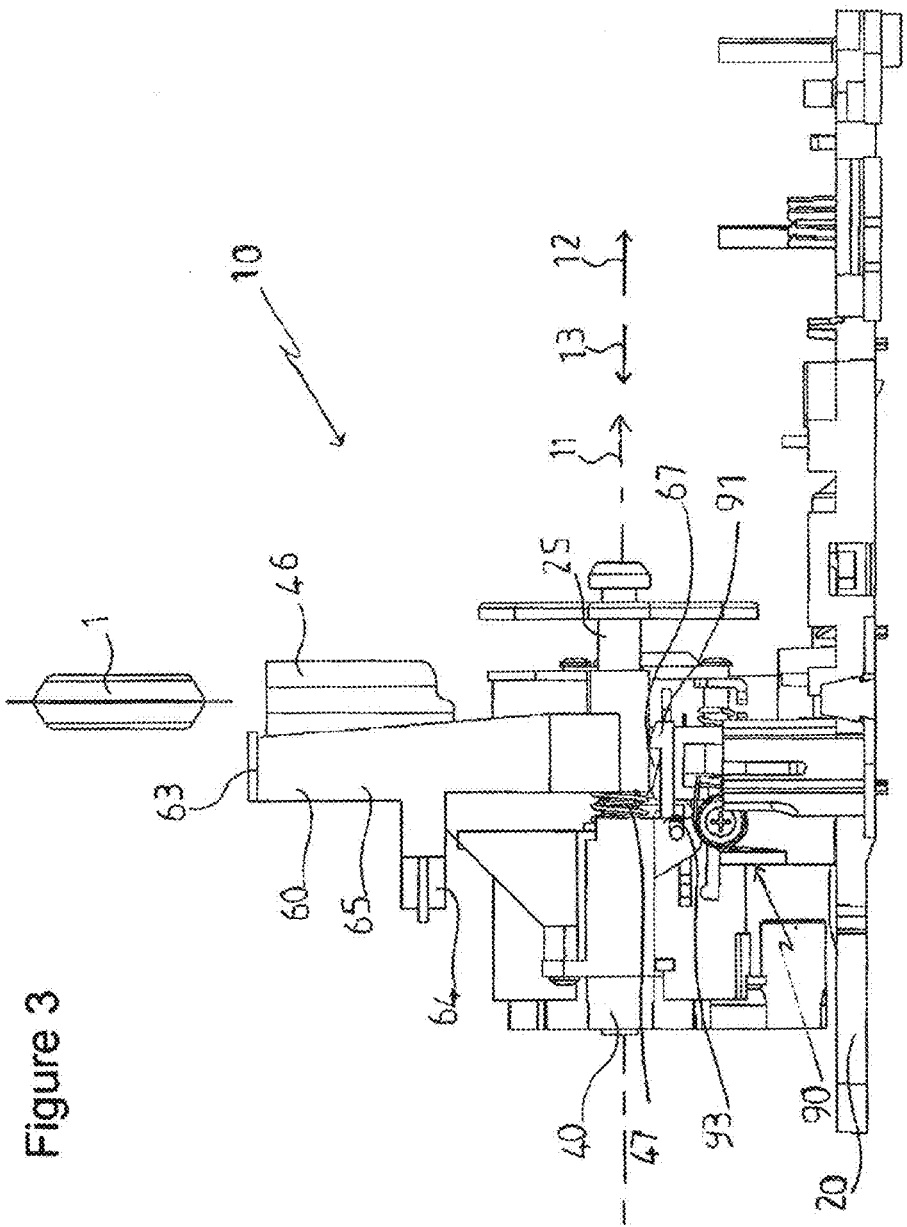
FIG. 3 is a right side view of the system shown in FIG. 1.
Figure 4:
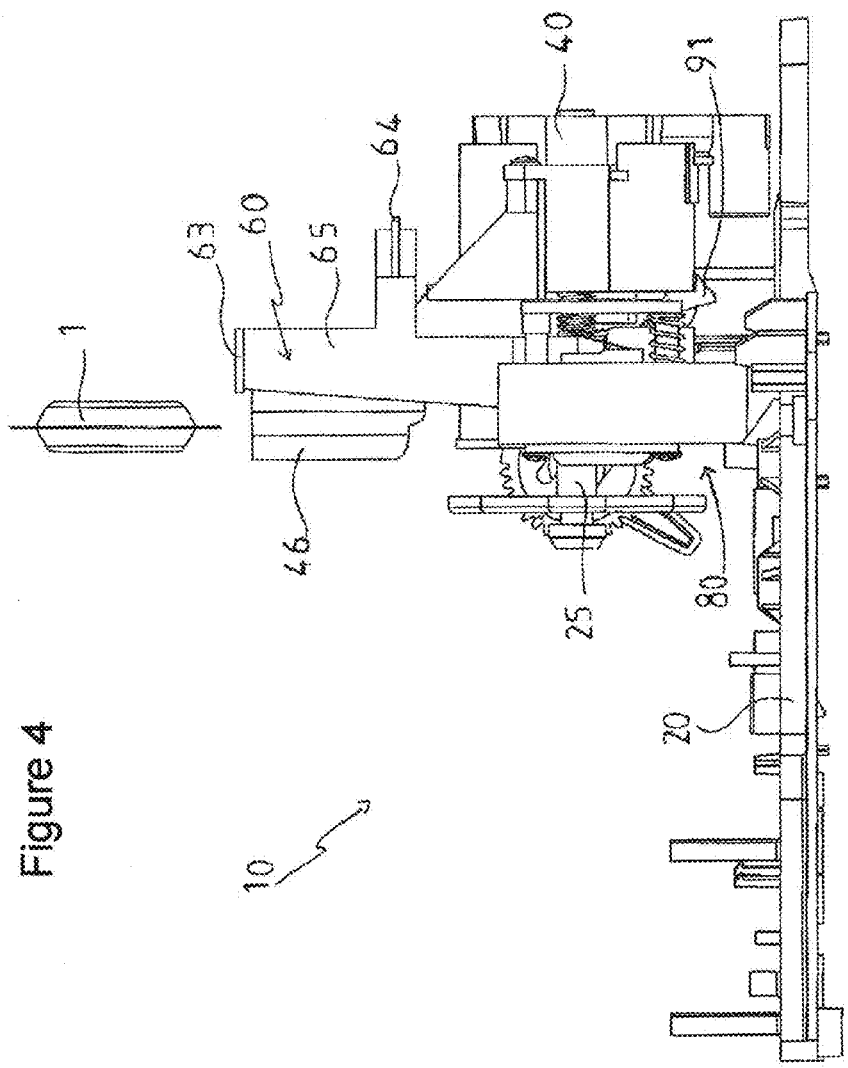
FIG. 4 is a left side view of the system shown in FIG. 1.
Figure 5:
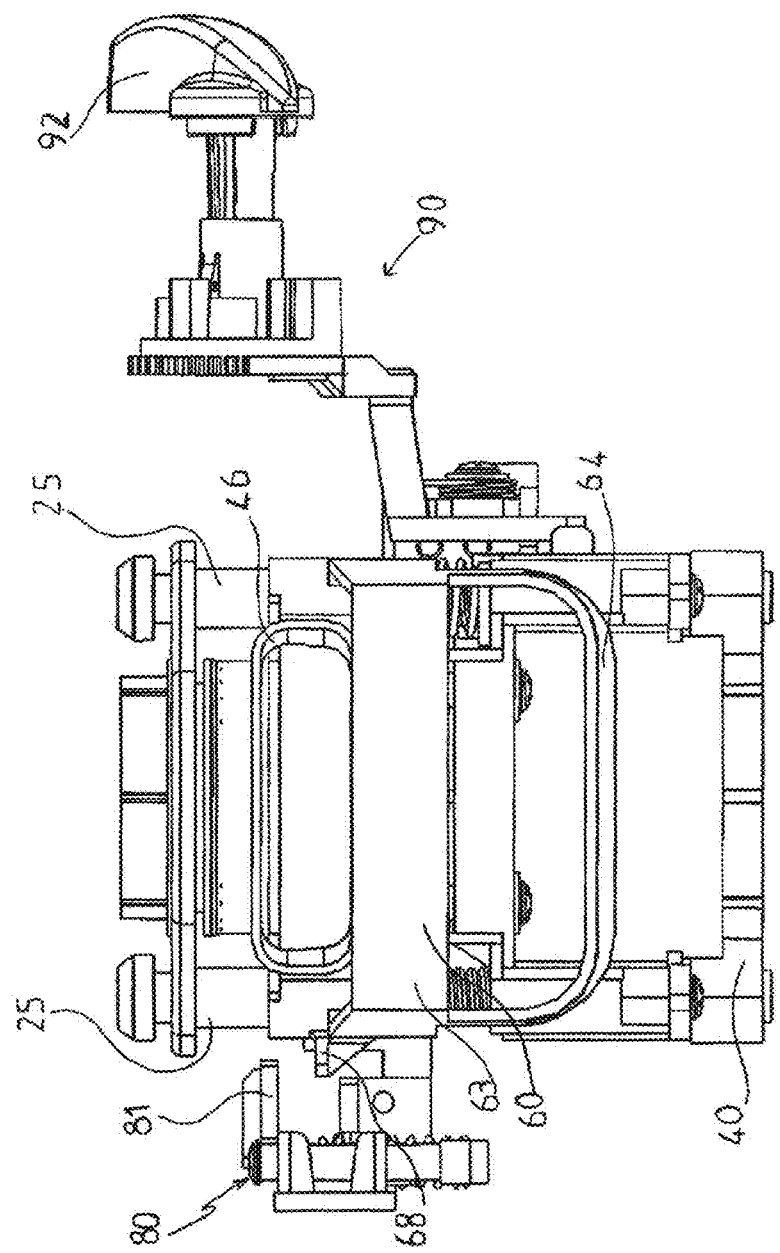
FIG. 5 is a top view of the system shown in FIG. 1.
Figure 6:
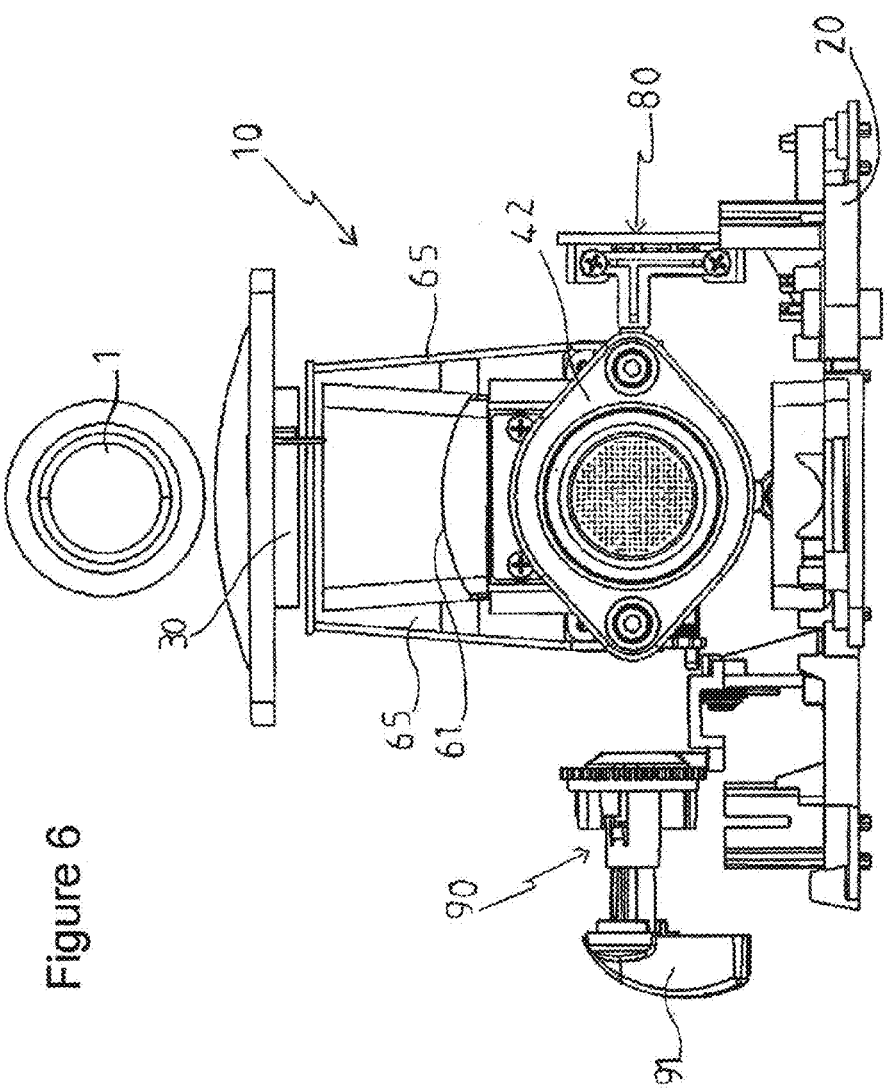
FIG. 6 is a front view of the system shown in FIG. 1, FIGS. 7 to 12 are longitudinal sections of the system shown in FIG. 1 and showing the various stages of the production process during machine operation.
Figure 7:
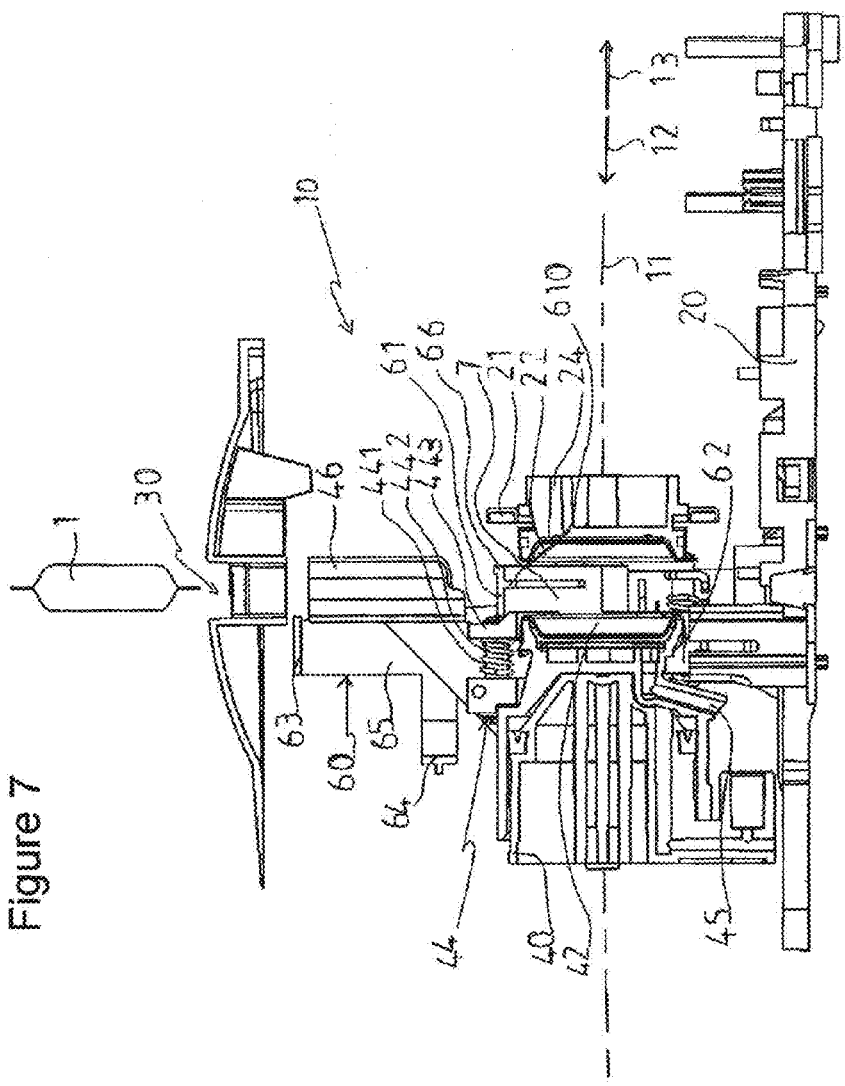
Figure 8:
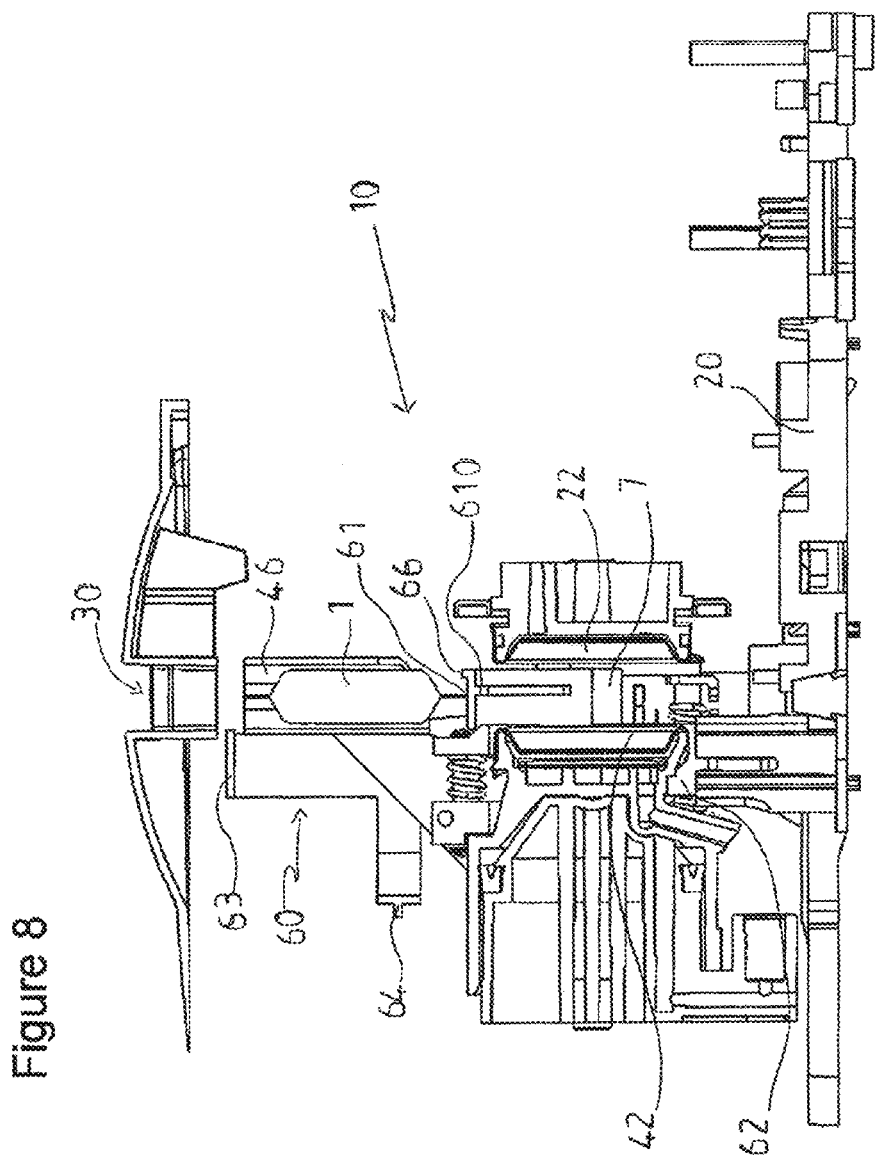
Figure 9:
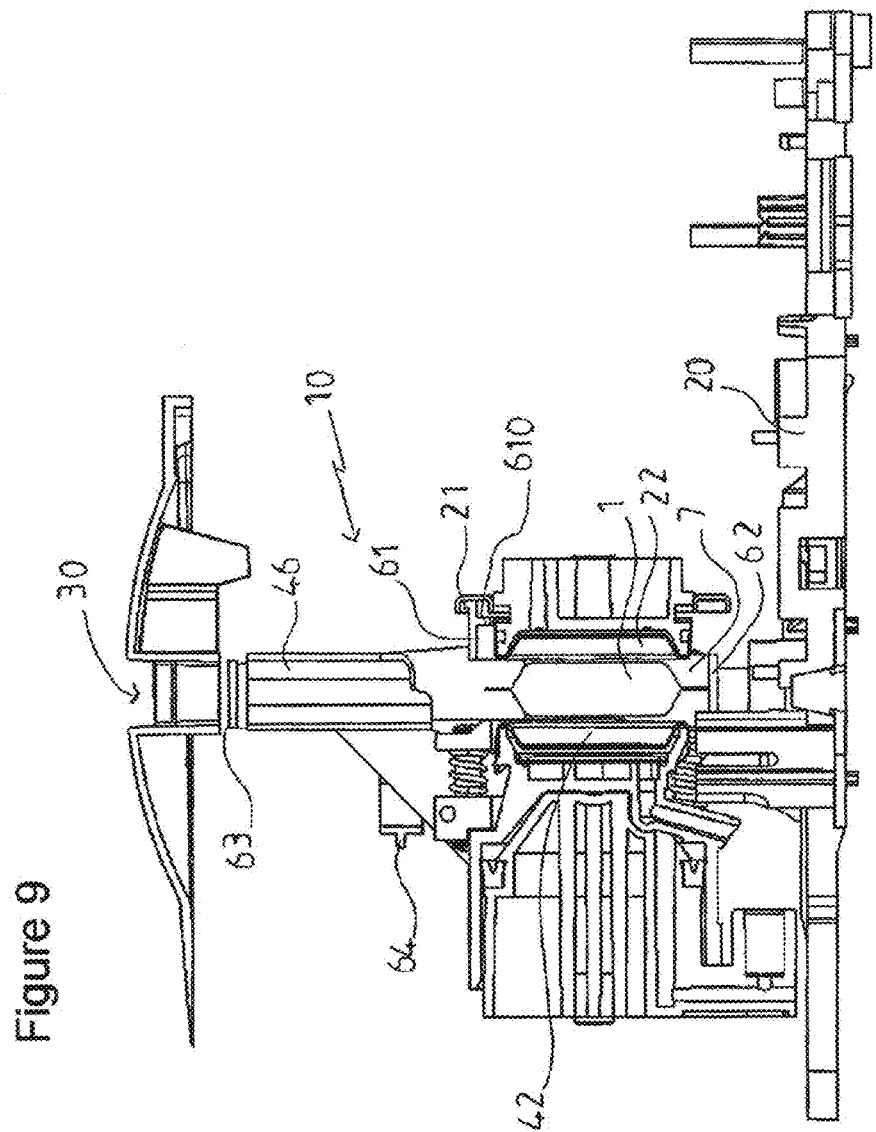
Figure 10:
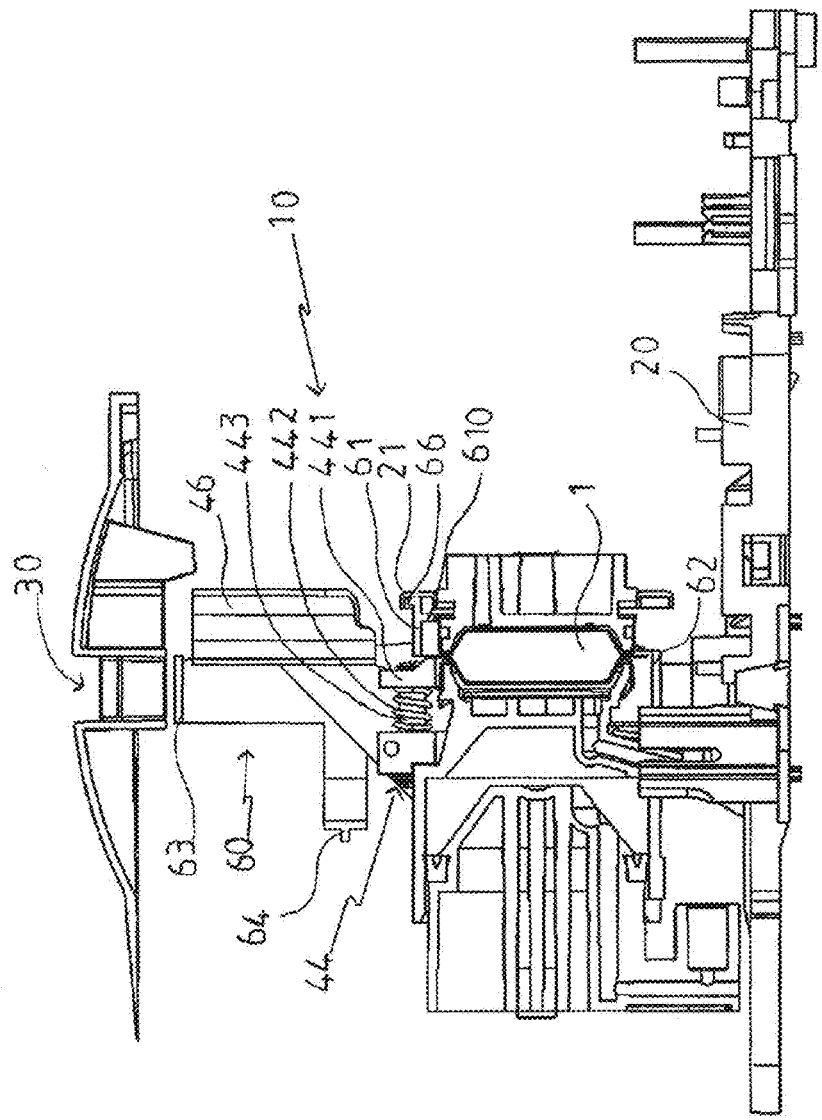
Figure 11:
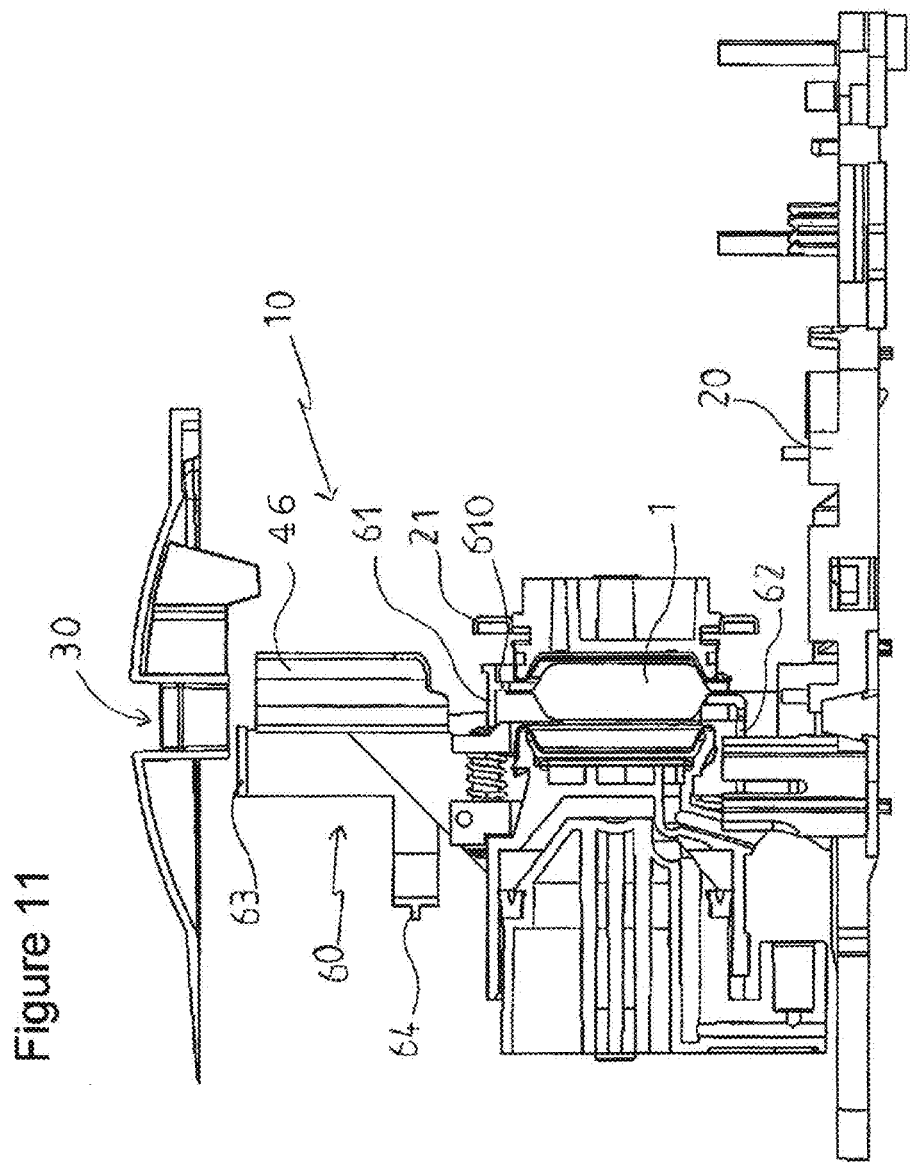
Figure 12:
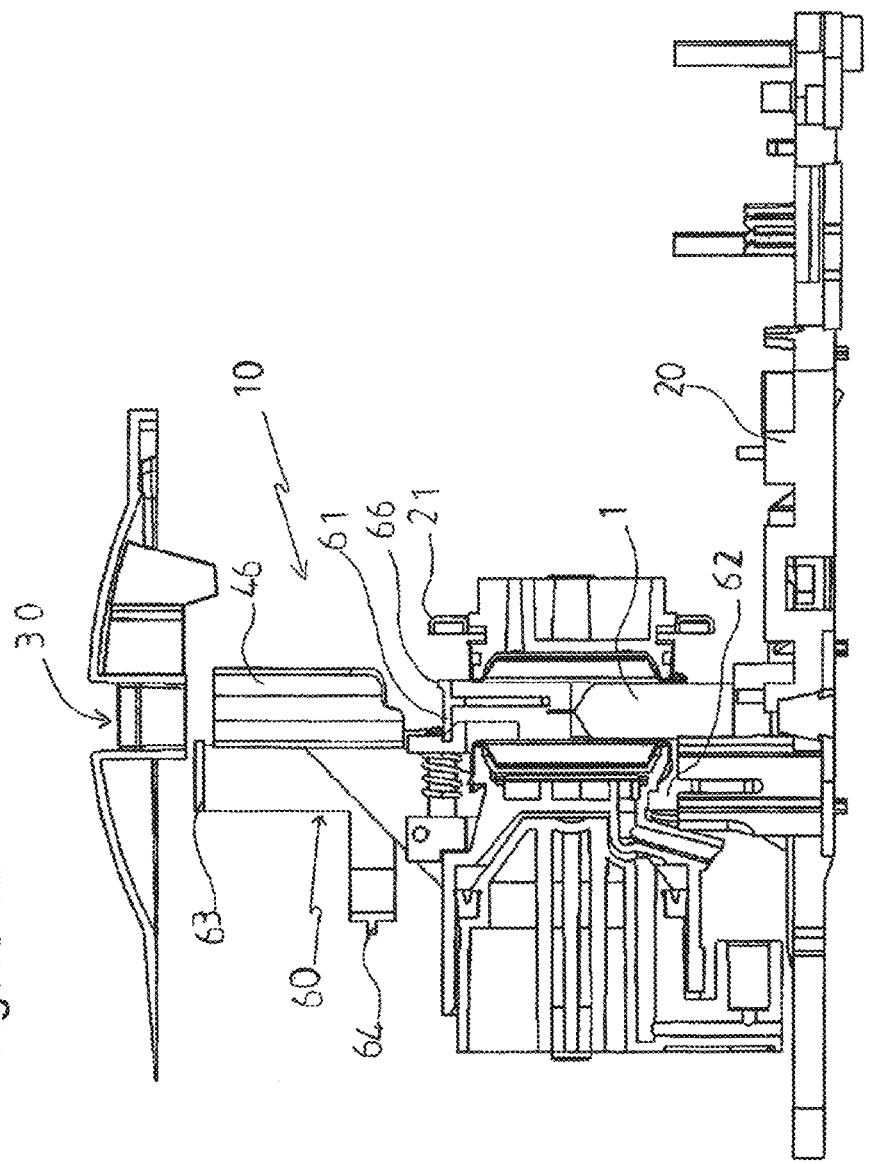

FIGS. 1 to 14 show a system 10 for preparing a beverage according to the invention.

The space arranged in front of and behind a point corresponding to the normal movement of a package 1 in the machine during a beverage preparation cycle are described as upstream and downstream.

The present invention uses packages of the type presented on FIGS. 3 to 12 and described in document WOA9507041, although this example is not restrictive. On these figures, the infused product, for example ground coffee, is enclosed in a volume inside package 1 consisting of the assembly of layers joined at their circumferential border. Advantageously, the present invention may be used with a variety of packages. In particular, this does not imply that the circumferential edge of package (1) has to be rigid.

System 10 according to the invention has an infusion chamber 7 designed to receive a package 1. Chamber 7 has two half chambers arranged to be apart or brought together mutually by an actuator in order to close or open infusion chamber 7.

The term "half chamber" designates parts that may be arranged so as to be in mutual contact or in contact with a package 1 in order to create a leaktight volume acting as infusion chamber 7. The invention does not imply that the two half chambers present any symmetry with one another.

In the embodiment given as the example, one of the two half chambers, designated hereafter as fixed half chamber 22, is interconnected to frame 20 of the machine. The other half chamber, designated as the moving half chamber, is supported by head 41 of hydraulic cylinder 40 acting as the actuator allowing the two half chambers to move closer and away from each other. Each one of the half chambers has one end that defines a circumference border contained in a plane that is roughly perpendicular to longitudinal axis 11.

Hereafter, the longitudinal direction including the translational axis of cylinder 40 will be designated as the longitudinal direction. Forward direction 12 is the direction on which each of the two half chambers come together, and backwards direction 13 the direction on which the two half chambers move apart.

In the context of the embodiment shown as an example, the two fixed half chambers 22 have an incoming water pipe 24 supplied by a hot water circuit. Conventionally, the hot water circuit includes a tank, a boiler for heating the water of the tank until the required temperature for its infusion in chamber 7 is reached, and a pump to increase the water pressure in the circuit. During infusion, both half chambers are kept firmly in contact with one another and define the volume receiving package 1. Leaktightness can be achieved by applying the circumference of the two half chambers onto the circumferential border of package 1 which then acts as a seal. Leaktightness can also be achieved or reinforced by using additional sealing means.

Mobile half chamber 42 has a beverage discharge pipe 45 communicating on the one hand with the inside of infusion chamber 7 and with beverage discharge on the other. This discharge pipe 45 discharges the beverage resulting from the infusion of package 1 into a recipient such as a coffee cup.

After infusion, when moving half chamber 42 is apart from the fixed half chamber 22, infusion chamber 7 is open and infused package 1 is no longer enclosed in chamber 7. Package 1 then fall by gravity from chamber 7 into the recovery tray.

Closure System

System 10 also includes a closure device 60. This closure device 60 comprises downstream closure means 62 and upstream closure means 61. It is separate from each of the half chambers 22, 42 that form infusion chamber 7.

Downstream Closure Means

Downstream closure means 62 are arranged downstream of infusion chamber 7. They are arranged so as to form a retractable stop for a package 1 entering chamber 7.

In a non-retracted position, when open, downstream closure means 62 receive package 1 introduced into chamber 7 and prevent this package 1 falling by gravity towards the downstream of chamber 7.

In this position, downstream closure means 62 also prevent any entry into chamber 7 from downstream. This prevents the user from, for example, inserting his fingers into chamber 7.

In a retracted position, downstream closure means 62 do not form a stop for package 1 in chamber 7 and therefore allow package 1 to drop out when opening chamber 7.

Upstream Closure Means

Upstream closure means 61 are arranged to act as a retractable stop. They are arranged upstream of infusion chamber 7.

In a non-retracted position, upstream closure means 61 prevent access to a package 1 or to any other element in infusion chamber 7 from upstream of the latter. In this non retracted position, upstream closure means 61 also receive and help to retain package 1 in position in system 10.

In the retracted position, upstream closure means 61 allow package 1 to be inserted into chamber 7 from upstream.

System 10 is arranged to pass closure device 60 alternately from the first position in which upstream closure means 61 prevent package 1 from entering chamber 7, and downstream closure means 62 ensure that no used package 1 remains in chamber 7, to a second position in which upstream closure means 61 allowed package 1 to enter chamber 7 and downstream closure means 62 allow package 1 to be received and retained in chamber 7.

Closure device 60 is arranged so that upstream closure means 61 condition the position of downstream closure means 62 and the position of downstream closure means 62 condition the position of upstream closure means 61.

Thus, for a given position of upstream closure means 61, downstream closure means 62 may only adopt a single position and vice versa. Therefore, the system operates sequentially.

However, the applicant has noted that in many existing systems, dysfunctions often occur due to incorrect relative positioning occurring between the upstream closure means and the downstream closure means. Thus, the invention significantly reduces the risks of the system jamming, notably due to the package getting caught up in the mechanical parts. This reduces the number of interventions required by a user or a repairer. It also protects the integrity of package 1. Moreover, it prevents a package introduced in the machine from falling directly into the recovery tank without being received by the infusion chamber.

Upstream closure means 61 and downstream closure means 62 are interconnected. This feature simplifies the kinematics, improves sturdiness, limits the fabrication costs and the number of defects encountered on system 10.

Figure 13:
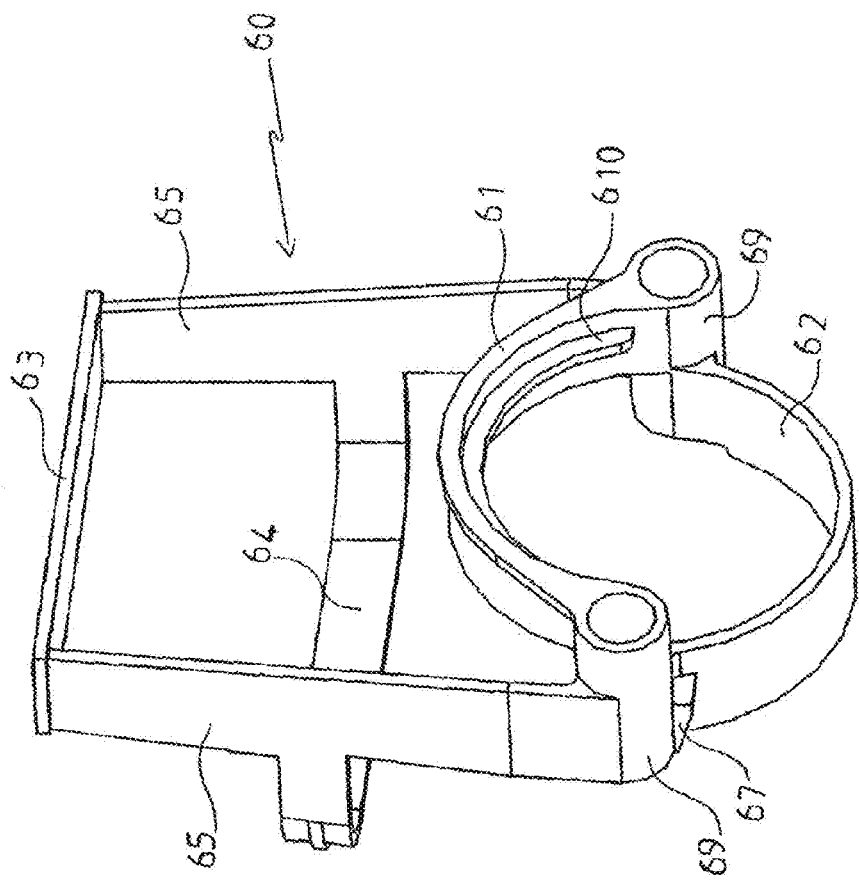
FIGS. 13 and 14 are views in perspective of the front and the rear respectively of the closure device equipping the system shown in FIG. 1.
Figure 14:
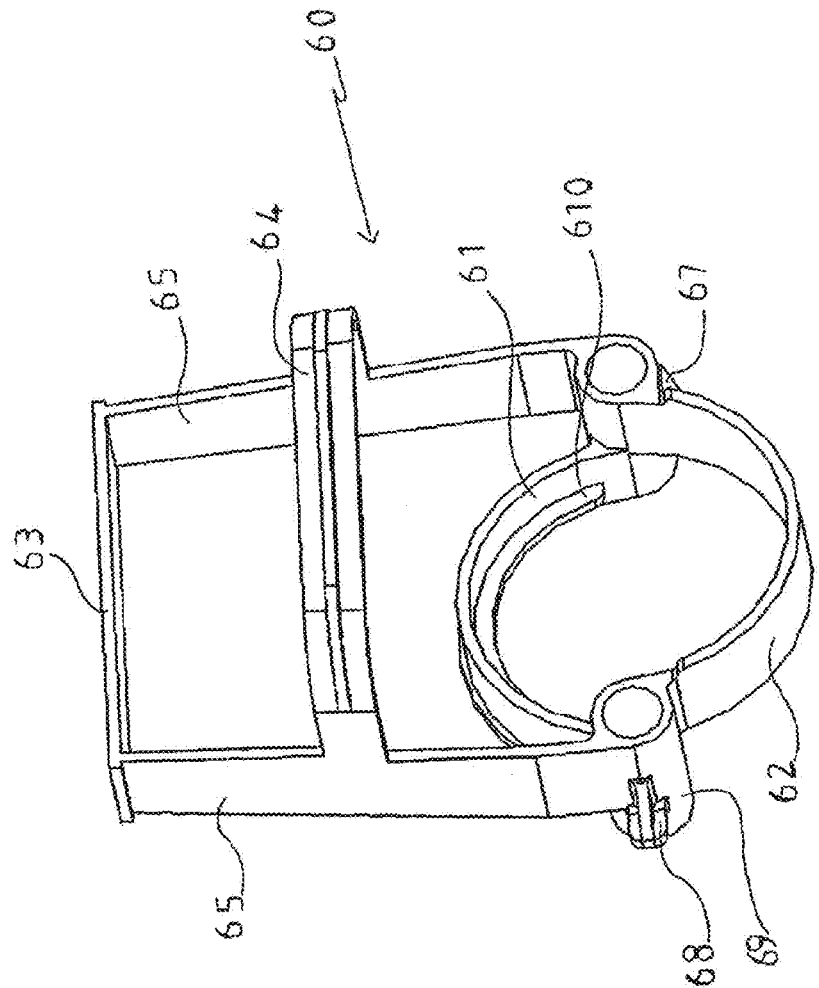

FIGS. 13 and 14 detail closure device 60 according to this embodiment. This closure device 60 includes:
  two guides arranged so as to guide closure device 60 in its alternating movement between the first and the second position. Each guide acts as a slide 69 that guides closure device 60 in translation along two shafts 25, 25 supported by frame 20 of system 10 and extending along guiding axes parallel to longitudinal axis 11,
  two arms 65, 65 each extending from its respective slide 69 in a direction roughly perpendicular to the guidance axis,
  upstream closure means 61 arranged so as to act as a stop for package 1 upstream of chamber 7 when closure device 60 is in the first position. In an advantageous configuration, upstream closure means 61 present the shape of part of a crown each end of which joins one of arms 65, 65 and which is centred on an axis parallel to the guiding axes,
  downstream closure means 62 arranged to stop package 1 downstream of chamber 7 when closure device 60 is in the second position. Advantageously, upstream closure means 62 present the form of part of a crown, each end of which joins one of two arms 65, 65 and which is centred on an axis parallel to the guiding axes.

Upstream closure means 61 and downstream closure means 62 are arranged so as to be offset relative to one another along the main direction of movement of closure device 60. Thus, in the second position, upstream closure means 61 are arranged roughly behind fixed half chamber 22. In the first position, upstream closure means 61 are arranged appreciably forward of fixed half chamber 22. In the first position, upstream closure means 62 are arranged essentially forward of moving half chamber 42.

This offset is dimensioned so that:
  when closure device 60 is in the first position, upstream the closure means 61 prevent package 1 entering chamber 7, and downstream closure means 62 allow used package 1 to exit chamber 7,
  when closure device 60 is in the second position, upstream closure means 61 allow package 1 to enter chamber 7, and downstream closure means 62 ensure package 1 is received and retained in chamber 7.

In this example, closure device 60 is fitted to slide on longitudinal axis 11, upstream closure means 61 and downstream closure means 62 are offset relative to one another along longitudinal axis 11. Upstream closure means 61 are arranged forward of downstream closure means 62 on this same axis.

Means of Actuation

System 10 has actuating means allowing alternating passage from the first to the second position. In fact these are the same actuating means that act on both the upstream closure means 61 and the downstream closure means 62.

Consequently, system 10 considerably reduces the risks of the packages jamming in the mechanism. In particular, system 10 prevents:
  a package 1 introduced into a system 10 from falling directly into the recovery tank without infusion having taken place. In fact, infusion chamber 7 is either plugged upstream by upstream closure means 61 to or downstream by downstream closure means 62.
  that there may be two packages present simultaneously in infusion chamber 7.

The reduced number of actuators significantly limits the complexity of the structure of system 10. This structure allows the kinematics of the bodies passing alternately from the first to the second position to be simplified. This reduces the size, the number of parts involved, the fabrication costs and the number of defects encountered.

The two shafts 25, 25 on which slide the two guides of closure device 60, play a role in the guiding connection between head 41 slide and hydraulic cylinder 40.

A spacer spring 47 tends to push closure device 60 forwards and set aside closure device 60 of head 41 of hydraulic cylinder 40.

In a preferred configuration, spacer spring 47 will be dimensions so that jamming of package one between closure device 60 and another component of system 10 does not affect the integrity of package 1. Thus, a spring applying a force of approximately 1.5 N on closure device 60 will be used.

The forward end of shafts 25, 25 is joined to frame 20 and the rear end these shafts is joined to the fixed part of hydraulic cylinder 40. The following are arranged longitudinally and respectively from front to back on each guide axis defined by shaft 25: the front end of a shaft 25, a slide 69 closure device 60, a spacer spring 47, head 41 of hydraulic cylinder 40 and lastly, the rear end of shaft 25.

Movement of closure device 60 towards the rear and engagement of the closure device 60 movement in one direction or another are described below in more detail.

Locking Means

System 10 also has means for automatically and reversibly joining closure device 60 on head 41 of hydraulic cylinder 40 when these two elements are close enough. The joining means include locking and unlocking means.

Locking means include a notch 91 supported at one end of a pivot and fitted to rotate on head 41 of hydraulic cylinder 40 on a horizontal axis perpendicular to longitudinal axis 11.

The locking means also include a pin 67 supported by the closure device 60 and visible on FIG. 13. Pin 67 is arranged so as to latch onto notch 91 when closure device 60 and head 41 of hydraulic cylinder 40 are close enough to one another.

The locking means also include a rotation spring 93 tending to engage notch 91 on pin 67 and maintain this engagement. Thus, when closure device 60 is close enough to head 41 of hydraulic cylinder 40, notch 91 and pin 67 coact to join closure device 60 on head 41 of hydraulic cylinder 40.

Unlocking means separate head 41 of hydraulic cylinder 40 from closure device 60. To do this, they are equipped with a control button 92 operated manually or automatically and a kinematic assembly acting on the pivot supporting notch 91. When button 92 is pressed, the pivot turns around its axis so as to release notch 91 from pin 67 thereby freeing closure device 60 from head 41 of hydraulic cylinder 40.

When both half chambers are apart and the unlocking means actuated, spacer spring 47 causes closure device 60 to move forwards until contacting stop seat 21 supported by frame 20 appreciably at the level of fixed half chamber 22. When hydraulic cylinder 40 is actuated, head 41 of hydraulic cylinder 40 is driven in translation until sufficiently close to closure device 60 for notch 91 to engage pin 67 of closure device 60 under the effective of rotation spring 93. Head 41 of hydraulic cylinder 40 and closure device 60 are then interdependent. When head 41 of hydraulic cylinder 40 returned backwards, notch 91 and pin 67 act to maintain the interdependence between head 41 of hydraulic cylinder 40 and closure device 60, also driving the latter backwards. It is to be noted that the compression spring between closure device 60 and head 41 of hydraulic cylinder 40 is dimensioned to prevent this interdependence failing.

Once head 41 of hydraulic cylinder 40 reaches the stop on the fixed part of hydraulic cylinder 40, the unlocking device may once again be tripped to re-release closure device 60 and begin a new cycle.

Guiding Means

System 10 also includes guiding means 46. These guiding means 46 have the shape of an appreciably elliptical sleeve that is able to prevent any significant movement of package 1 in the horizontal plane and allow its vertical displacement. These guiding means 46 coact with head 41 of hydraulic cylinder 40. They are arranged so as to guide package 1 upstream of upstream closure means 61. Moreover, they are arranged longitudinally so as to be positioned opposite the opening to chamber 7 in the first position and allow insertion of package 1 into the latter when upstream closure means 61 are retracted. In the second position, they are arranged so as to be appreciably forward of chamber 7.

In addition, they are arranged vertically so as to be close enough to upstream closure means 61 so as to ensure that package 1 is retained when the latter rests on the upstream closure means 61. Thus, when a package 1 rests on upstream closure means 61 and the latter 34 translates forward, guiding means 46 help prevent any notable longitudinal translation of package 1. The latter is therefore retained opposite the opening of infusion chamber 7 when upstream closure means 61 are fully retracted. The relative movement of closure device 60 and guiding means 46 allow package 1 to transfer from upstream closure means 61 into chamber 7. Moreover, this relative movement protects the integrity of package 1 during this transfer.

These guiding means 46 maintain package 1 in position resting on upstream closure means 61 in order to facilitate the installation of this package 1 in chamber 7. Guiding means 46 have two appreciably parallel and vertical grooves that coact with the circumferential border of package 1 in order to help guide it.

Trap Door

System 10 also includes a trap door 30 forming an opening arranged upstream of upstream closure means 61 and downstream of guiding means 46. The opening is arranged longitudinally so that it is positioned at the level of the upstream closure means 61 when closure device 60 is in the first position. The opening formed by trap door 30 can be accessed by an user and is designed to receive package 1 for introduction into system 10.

Obstructing Means

Closure device 60 comprises obstructing means 63 arranged so that:
the opening of trapdoor 30 is plugged when closure device 60 is in the second position,
trap door 30 opening remains free when closure device 60 is in the first position.

Obstructing means 63 include an upper stop arranged upstream of upstream closure means 61, upstream of guiding means 46 and downstream of trap door 30 opening. The upper stop extends from arm 65 to the other closure device 60 and acts as a retractable stop for package 1. It is arranged along longitudinal axis 11, appreciably at the level of downstream closure means 62.

Thus, when closure device 60 is in the first position, package 1 inserted into the opening provided by trap door 30 has free access to guiding means 46 and stops when reaching upstream closure means 61.

When closure device 60 is arranged in the second position, the insertion of package 1 into the opening formed by trap door 30 is stopped upstream of guiding means 46 by obstructing means 63. This package 1 does not therefore access either upstream closure means 61, downstream closure means 62 or chamber 7.

Obstructing means 63 prevent a package 1 being inserted when there is already another package 1 in upstream closure means 61 or in chamber 7.

Moreover, when closure device 60 is in the second position, obstructing means 63 prevent any access to infusion system 10 and this improves the overall safety of the machine. Indeed, in this position an user cannot insert an object or his fingers inside system 10.

Advantageously, closure device 60 is formed from a single piece of material. Closure device 60 may be made of aluminium, stainless steel or plastic.

Pump Slaving Means and Warning Means

As mentioned previously, system 10 has a pump that is designed to supply chamber 7 with liquid. In the particular example described, this pump also supplies the actuator opening and closing chamber 7. In fact, the pump feeds a hydraulic circuit actuating hydraulic cylinder 40.

The pump is supplied with electricity from an electrical circuit equipped with a first and the second switch.

The first switch closes on an order from an user. Advantageously, control button 92 is connected to the first switch and when operated closes it.

The second switch closes when closure device 60 is in the second position. More precisely, system 10 has slaving means 80 arranged so as to operate the pump based on the position of closure device 60. These slaving means 80 act as a second switch and are equipped with a limit switch contactor 81 interconnected to frame 20, together with a contact finger 68 on closure device 60 arranged so as to coact with contactor 81. Contact finger 68 on FIG. 14 shows closure device 60 in detail. Slaving means 80 are arranged so that contactor 81 and contact finger 68 are in contact one with the other and closure device 60 is arranged in the second position. In this position, contact finger 68 rests on contactor 81 and is used to close the electrical supply to the pump. In this position, the pump is supplied with electricity and can function. When the circuit is open, i.e. when contactor 81 is not pushed by contact finger 68, the pump is unable to function. Thus, operation of the pump is dependent on the appropriate position of upstream closure means 61 and downstream closure means 62.

Thus, the invention significantly improves control of the relative position between upstream closure means 61, downstream closure means 62, guiding means 46, and the two half chambers 22 and 42. The likelihood of a system 1 dysfunction are therefore reduced considerably.

The second switch accepts two positions:
- a so-called "operating position" in which it is possible to close the pump control circuit. This operating position is reached when closure device 60 butts against fixed half chamber 22 and control button 92 has been actuated by an user.
- a so-called "non-operating position", in which the circuit supplying the warning means can be closed.

Indeed, system 10 has warning devices on the pump feed circuit. These warning devices are supplied with electricity when the first switch is closes and the positions of contactor 81 and contact finger 68 prevent supply to the pump.

Once they receive a supply, the warning means trip a visual and sound warning, for instance to inform the user that the machine is not working normally and that it requires attention. This intervention on the machine may consist in taking hold of closure device 60 and bringing it to the appropriate position in order to reset system 10. To do this, the latter system is equipped with gripping component 64 that can be easily accessed by the user opening an upper cover housing system 10 for instance. This gripping component 64 acts as a handle extending horizontally towards the rear and has two ends connected respectively to one of arms 65. This intervention may also require withdrawal of a package 1 or any jammed object when this is the cause of the pump's incorrect position.

Consequently, system 10 makes a significant improvement to the user's safety. Indeed, if upper trap door 30 remains open due to the presence of any obstacle whatsoever, in particular fingers, the pump does not operate and hydraulic cylinder 40 does not translate, nor can water injection into chamber 7 start. Operation of the system is therefore sequential and conditional.

Moreover, slaving means 80 also prevent the pump from operating when an obstacle in the lower part of system 10 prevents closure device 60 from adopting a correct position. Thus, when the recovery tray is full and an infused package 1 cannot be correctly ejected and prevents proper operation of closure device 60, the pump is unable to operate and the alarms are activated.

The invention also makes it possible to protect the integrity of a package 1 present in chamber 7 when closure device 60 is blocked. Indeed, operating the pump would lead to package 1 being crushed and wetted.

First Stripping Means

System 10 is also equipped with the same first stripping means 610 arranged in order to separate package 1 from fixed half chamber 22 once infusion has taken place. Indeed, firm contact between package 1 and the half chambers may prevent package 1 being ejected when fixed half chamber 22 moves away and downstream closing means 62 are withdrawn. First stripping means 610 have the general shape of a sharp edge extending appreciably in the form of a crown, this sharp edge being interconnected to closure device 60 and arranged at the level of upstream closure means 61. These first stripping to means 610 are arranged so as to come into contact with the circumferential border of package 1 and move the latter back when closure device 60 returns backwards. These first stripping means 610 have a particularly simple structure and make an appreciable improvement to the operation of system 10.

Second Stripping Means

System 10 is also equipped with second stripping means 44 arranged to ensure that package 1 is perfectly stripped from mobile half chamber 42 once infusion has taken place. These second stripping means 44 include a stripping shaft 441 assembled to slide longitudinally on head 41 of hydraulic cylinder 40, the forward end of which has a stripping finger 443.

A stripping spring 442 acting in compression and installed on stripping shaft 441 between head 41 of hydraulic cylinder 40 and finger 443. It tends to push the latter forwards.

These second stripping means 44 are arranged so that stripping spring 442 brings finger 443 into contact with the circumferential border of package 1 inserted into chamber 7 and separates the latter from mobile half chamber 42. When performing a stripping function, finger 443 is arranged forward of the front end of mobile half chamber 42.

This stripping spring 442 exerts a force on package 1 that is so small as not to damage the latter if jammed. For instance, this spring is designed to apply a force around 0.2 N.

Example of a Method for Preparing a Beverage Using the Invention

The sequence of operations for preparing a beverage will be described below based on FIGS. 8 to 12.

At the start of the cycle, head 41 of hydraulic cylinder 40 is forced backwards and mobile half chamber 42 is then apart from fixed half chamber 22 and chamber 7 is therefore open. Joining means 90 ensure that there is a firm contact between head 41 of hydraulic cylinder 40 and closure device 60. The latter is therefore arranged in the first position. As a result:
- upstream closure means 61 prevent access to infusion chamber 7 from the upstream part of the latter,
- downstream closure means 62 allow an already infused package 1 present in chamber 7 to be ejected by gravity,
- obstructing means 63 allow free passage through the opening formed by trap door 30,
- guiding means 46 are positioned at the opening formed by trap door 30.

Moreover, the rear end of first stripping means 610 is positioned behind the rear end of fixed half chamber 22. The forward end of the second stripping means 44 is positioned forward of the forward end of mobile half chamber 42. Thus, there is no already-infused package 1 between the two half chambers.

The user inserts package 1 in the opening of trap door 30. Package 1 falls by gravity while being guided and then maintained in the appreciably vertical position by guiding means 46. The fall of package 1 is stopped by upstream closure means 61 positioned opposite the opening of trap door 30 and guiding means 46. These upstream closure means 61 prevent package 1 entering chamber 7.

At a later stage, the user actuates unlocking means using control button 92. These unlocking means eliminate the joining together of hydraulic cylinder 40 and closure device 60. The latter is then free to slide forwards under the force exerted by spacer spring 47. During this movement, upstream closure means 61 move forwards and guiding means 46 remain fixed, thereby maintaining package 1 at the level of the opening of chamber 7. Progressively as they move forward, upstream closure means 61 free the opening of chamber 7. Moreover, downstream closure means 62 gradually obstruct the opening of chamber 7 downstream thereof. When the opening of chamber 7, now freed by upstream closure means 61, has become large enough, package 1 falls by gravity into chamber 7 where it is received by downstream closure means 62 forming a stop.

Forward movement of closure device 60 continues until the moving stop of end of travel 66 on the latter comes into contact with the seat of stop 21 on frame 20. In this position, closure device 60 is in the second position. In this position:

- upstream closure means 61 allow upstream access to infusion chamber 7,
- downstream closure means 62 receive package 1 introduced into to chamber 7,
- obstructing means 63 obstruct the opening to trap door 30, thereby preventing packages or any other object entering through this opening,
- contactor 81 is in contact with finger 443 and slaving means 80 to is allow the pump to operate.

The cylinder hydraulic circuit is supplied by the pump and hydraulic cylinder 40 drives the movement of head 41 of hydraulic cylinder 40 forwards until the two half chambers form a leaktight volume enclosing package 1. Water heated by the boiler and taken from the tank penetrate this closed chamber 7 so that package 1 is able to infuse. Discharge pipe 45 on mobile half chamber 42 pipes the extracted beverage towards the container.

When head 41 of hydraulic cylinder 40 is applied firmly against the circumference of package 1 and the rear end of fixed half chamber 22, notch 91 of the locking means coacts with pin 67 of closure device 60 so as to fix the latter on head 41 of hydraulic cylinder 40.

Once the infusion process has ended, head 41 of hydraulic cylinder 40 begins its withdrawal towards the rear under the effect of a return compression spring driving closure device 60 with it. Second stripping means 44 ensure that package 1 is separated from moving half chamber 42.

During translation of closure device 60 towards the rear, the first stripping means 610 come into contact with the circumference of package 1 separating it from fixed half chamber 22. Package 1 is then positioned between the two half chambers without being interconnected to either of them.

Both half chambers are cup-shaped and appreciably guiding package 1 towards the opening of chamber 7 when they move apart. Closure device 60 is brought back to the first position: Downstream closure means 62 no longer prevent ejection of package 1 and the latter can then fall by gravity towards the chamber 7 recovery tray. obstructing means 63 leave the opening of trap door 30 unobstructed and a new package 1 can be inserted into system 10.

Advantageously, the invention operates sequentially and this improves the reliability of the existing systems, reduces the risks of the mechanism jamming and protects package integrity.

It also offers simple kinematics and structure. It has fewer parts, lower fabrication cost, less defects and is less difficult to maintain.

It also offers conditional operation, that is to say, when operating the pump is slaved to the position of the closure device. The reliability of the system as well as the safety of users is enhanced and the package's integrity preserved.

It also offers improved sturdiness and is of a smaller size.

Other Embodiments

Many variants can be made to the previously described device without this escaping the scope of the invention.

In particular, closure device 60 can be arranged to change alternately from the first position to the second position by rotational movement and not by translational movement. This rotation may take place on longitudinal axis 11 or on a vertical axis or on a horizontal axis perpendicular to the longitudinal axis 11. In these cases, care will be taken to ensure that upstream closure means 61 and downstream closure means 62 present an appropriate angular offset onto the rotational axis of closure device 60.

Closure device 60 may also be arranged so that it translates along a main direction different from that of longitudinal axis 11, for example a main direction horizontal and perpendicular to longitudinal axis 11. For a closure device 60 of this type, upstream closure means 61 and downstream closure means 62 are offset on this main direction.

In the example described previously, a hydraulic cylinder 40 operates mobile half chamber 42 and closure device 60. In other embodiments, this action may be carried out manually using for example a lever or a screw-type drive system or a pneumatically operated jack.

Opening and closing infusion chamber 7 can also be envisaged by moving the two half chambers. The movement of each of these two half chambers relative to frame 20 can take place either by translation or by rotation.

The adaptation of system 10 described above to packages different from the ones shown on the figures is easily carried out by simply altering the dimensions and the configuration of upstream closure means 61 and downstream closure means 62, guiding means 46, and the opening of trap door 30 and two half chambers 22, 42.

REFERENCES

1. Package
10. System
11. Longitudinal axis 11
12. Forward direction
13. Backward direction
20. Frame
21. Stop seat
22. Fixed half chamber
24. Incoming pipe
25. Shaft
30. Trap door
40. Hydraulic cylinder
41. Cylinder head
42. Moving half chamber
44. Second stripping means
441. Stripping shaft
442. Stripping spring
443. Finger
45. Discharge pipe
46. Guiding means
47. Spacer spring
60. Closure device
61. Upstream closure means
62. Downstream closure means
63. Obstructing means
64. Gripping element
65. Arm
66. End of travel moving stop
67. Pin
68. Contact finger
69. Slide
610. First stripping means
7. Chamber
80. Slaving means
81. Contactor
90. Joining means
91. Notch
92. Control button
93. Rotation spring

The invention claimed is:

1. A system for producing beverages by infusing a product contained in a package, comprising:
 a frame;
 a guiding chute mounted to the frame and configured to receive the package through an opening and guide the package downward in a downstream direction by gravity;
 an infusion chamber mounted to the frame downstream from and in vertical communication with the guiding chute, the infusion chamber configured to receive the package by gravity from the guiding chute through an upper end of the infusion chamber,
  the infusion chamber comprises two half chambers arranged so as to move apart from one another or come together in order to open or close the infusion chamber, respectively; and
 a closure device formed as a unitary part and comprising:
  an upstream closure element arranged as a portal between the guiding chute and the infusion chamber so as to selectively prevent or allow the package to enter the infusion chamber when the infusion chamber is open, the upstream closure element being arranged to act as a retractable stop for the package, and
  a downstream closure element arranged as a portal between the infusion chamber and an exit beneath the infusion chamber in the downstream direction so as to selectively prevent or allow the package from exiting the infusion chamber via a lower end of the infusion chamber when the infusion chamber is open,
 the closure device arranged to move alternately:
  from a first position in which:
   the upstream closure element prevents the package entering the infusion chamber,
   the downstream closure element permits the package to exit the infusion chamber by gravity through the lower end of the infusion chamber,
  to a second position in which:
   the upstream closure element permits the package to enter the infusion chamber from the guiding chute through an upper end of the infusion chamber,
   the downstream closure element permits the package to be received into the infusion chamber and prevents the package from exiting the infusion chamber, and
 wherein the closure device is arranged so that:
  the position of the upstream closure element conditions the position of the downstream closure element,
  the position of the downstream closure element conditions the position of the upstream closure element, and
  the closure device is arranged to move in translation relative to the frame in order to move alternately from the first position to the second position.

2. The system according to claim 1, wherein the upstream closure element is directly interconnected to the downstream closure element.

3. The system according to claim 1, further comprising:
 a pump supplying infusion chamber with fluid and/or an actuator allowing mutual displacement of the half chambers and a slaving element arranged so that pump operation and/or actuator operation are slaved to the position of the closure device.

4. The system according to claim 1, wherein the upstream closure element are arranged so as to receive and retain the package outside the infusion chamber in the first position.

5. The system according to claim 1, further comprising:
 a guiding element arranged so as to guide the package upon introduction into the infusion chamber and keep the package at a level of the infusion chamber on withdrawal of the upstream closure means.

6. The system according to claim 1, further comprising:
 a mobile trap door located at the opening of the guiding chute upstream of the upstream closure means,
 wherein the closure device includes an obstructing element arranged so as to:
  permit the trap door to open when the closure device is arranged in the first position, and
  prevent the trap door from opening when the closure device is arranged in the second position.

7. The system according to claim 6, wherein the upstream closure element, the downstream closure element, and the obstructing element are directly interconnected to one another.

8. The system according to claim 1, further comprising:
 a warning device configured to dispatch a warning signal to a user when the closure device is not properly positioned.

9. A machine for making beverages by infusing a product contained in a package and comprising a system according to claim 1.

* * * * *